(12) United States Patent
Yang et al.

(10) Patent No.: US 11,723,048 B2
(45) Date of Patent: *Aug. 8, 2023

(54) INFORMATION SENDING METHOD, INFORMATION RECEIVING METHOD, APPARATUS AND SYSTEM

(71) Applicant: GUANGDONG OPPO MOBILE TELECOMMUNICATIONS CORP., LTD., Guangdong (CN)

(72) Inventors: Ning Yang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 34 days.

This patent is subject to a terminal disclaimer.

(21) Appl. No.: 17/326,622

(22) Filed: May 21, 2021

(65) Prior Publication Data

US 2021/0274490 A1    Sep. 2, 2021

Related U.S. Application Data

(63) Continuation of application No. 16/474,908, filed as application No. PCT/CN2016/112631 on Dec. 28, 2016, now Pat. No. 11,039,445.

(51) Int. Cl.
*H04W 72/51*  (2023.01)
*H04L 5/00*  (2006.01)
*H04W 48/08*  (2009.01)

(52) U.S. Cl.
CPC ........... *H04W 72/51* (2023.01); *H04L 5/0037* (2013.01); *H04W 48/08* (2013.01)

(58) Field of Classification Search
CPC ... H04W 72/048; H04W 48/08; H04W 48/12; H04W 92/10; H04W 8/24;
(Continued)

(56) References Cited

U.S. PATENT DOCUMENTS

| 2002/0004840 A1 | 1/2002 | Harumoto et al. |
| 2005/0180313 A1 | 8/2005 | Kim et al. |

(Continued)

FOREIGN PATENT DOCUMENTS

| CN | 101207912 | 6/2008 |
| CN | 102448176 | 5/2012 |

(Continued)

OTHER PUBLICATIONS

Wang, "Research on Cooperative Communication and Spectrum Management for Cognitive Radio Network," Chinese Master's Theses Full-Text Database, 2011.

(Continued)

*Primary Examiner* — Dinh Nguyen
(74) *Attorney, Agent, or Firm* — Hodgson Russ LLP (57) ABSTRACT

Embodiments of the present disclosure relate the field of communications. Provided are an information sending method, an information receiving method, an apparatus and a system. The method includes: generating, by a terminal, UE capability information, the UE capability information being used for indicating a parallel processing capability of the terminal for signals sent and/or received by subcarriers having different subcarrier intervals and/or used for indicating a data caching capability of the terminal; sending, by the terminal, the UE capability information to an access network device; and receiving, by the access network device, the UE capability information.

12 Claims, 7 Drawing Sheets

(58) Field of Classification Search
CPC ........... H04W 72/0413; H04W 72/042; H04W 72/1205; H04W 72/51; H04L 5/0037
See application file for complete search history.

(56) References Cited

U.S. PATENT DOCUMENTS

| | | | | |
|---|---|---|---|---|
| 2011/0177807 | A1* | 7/2011 | Cho | H04W 72/042 455/422.1 |
| 2013/0028239 | A1* | 1/2013 | Dinan | H04L 27/2657 370/336 |
| 2015/0334769 | A1 | 11/2015 | Kim et al. | |
| 2017/0156140 | A1* | 6/2017 | Islam | H04L 5/0044 |
| 2018/0132200 | A1 | 5/2018 | Gheorghiu et al. | |

FOREIGN PATENT DOCUMENTS

| | | |
|---|---|---|
| CN | 102892148 | 1/2013 |
| EP | 2579663 | 2/2016 |
| WO | 2015044769 | 4/2015 |
| WO | 2015139363 | 9/2015 |

OTHER PUBLICATIONS

IPA, Office Action for AU Application No. 2016434076, dated Oct. 6, 2021.
EPO, Extended European Search Report for EP Application No. 21187109.0, dated Nov. 12, 2021.
CNIPA, Notification to Grant Patent Right for Invention for CN Application No. 201680091927.8, dated Nov. 10, 2021.
ISDEC, Office Action for CA Application No. 3048652, dated May 13, 2021.
CNIPA, First Office Action for CN Application No. 201680091927.8, dated Jun. 10, 2021.
DGIP, Office Action for ID Application No. P-00201906475, dated Jul. 14, 2021.
ILPO, Office Action for IL Application No. 267710, dated Jun. 24, 2021.
Fan et al., "Research on Baseband Technology of Filtered-OFDM Wireless Communication", Journal of Chongqing University of Technology (Natural Science), Sep. 2016.
TIPO, Office Action for TW Application No. 106141463, dated Aug. 6, 2021.
IP Vietnam, Office Action for VN Application No. 1-2019-04043, dated Jul. 20, 2022.
IMPI, Office Action for MX Application No. MX/A/2019/007827, dated Oct. 7, 2022.

* cited by examiner

INFORMATION SENDING METHOD, INFORMATION RECEIVING METHOD, APPARATUS AND SYSTEM

CROSS-REFERENCE TO RELATED APPLICATION

This application is a continuation of U.S. patent application Ser. No. 16/474,908, filed Jun. 28, 2019, which is a U.S. National Stage Entry of International Application No. PCT/CN2016/112631, filed Dec. 28, 2016, the entire disclosures of which are incorporated herein by reference.

TECHNICAL FIELD

The embodiments of the present disclosure relates to the field of communications, and more particularly, to an information sending method, an information receiving method, an apparatus and a system.

BACKGROUND

In systems of Long-Term Evolution (LTE), the time-frequency resources used in the uplink and downlink include several subcarriers in the frequency domain, and the subcarrier spacing of each subcarrier is fixed at 15 kHZ.

In order to flexibly meet the transmission needs of different services, a configurable subcarrier spacing is introduced in the 5th generation mobile communication (5G) technology. The 5G system is also known as new radio (NR) system. The configurable subcarrier spacing refers to a flexible configuration of time-frequency resource blocks with different subcarrier spacings instead of time-frequency resource blocks with fixed subcarrier spacings; for example, a frequency-domain bandwidth is divided into a time-frequency resource block with a subcarrier spacing of 15 kHZ, a time-frequency resource block with a subcarrier spacing of 30 kHZ and a time-frequency resource block with a subcarrier spacing of 60 kHZ.

When an access network device sends data to a terminal, it is allowed to use at least two subcarriers with different subcarrier spacings to perform parallel transmission, which requires the terminal to have a capability of parallel processing on signals transmitted by the subcarriers with different subcarrier spacings. However, since the system maximum bandwidth and peak rate in the 5G system are greatly improved compared with the LTE system, it will dramatically increase costs of the design of terminals if software and hardware capabilities of the terminals are designed to satisfy the system maximum bandwidth and peak rate. Therefore, different terminals in 5G systems in the future may have different capabilities of software and hardware, that is, the parallel processing capabilities of different terminals are different. However, the uplink/downlink transmission schedule technology in LTE is performed on the hypothesis that terminals are able to satisfy the system maximum bandwidth and peak rate, and is inapplicable to the 5G system in the future.

SUMMARY in order to solve the problem that the uplink/downlink transmission schedule technology in LTE is performed on the hypothesis that terminals are able to satisfy the system maximum bandwidth and peak rate and is inapplicable to the 5G system in the future, the present disclosure provides an information sending method, an information receiving method, an apparatus and a system. The technical solutions are as follows.

According to a first aspect of the present disclosure, there is provided an information sending method, including:

generating, by a terminal, User Equipment (UE) capability information, the UE capability information being used for indicating a parallel processing capability of the terminal for signals sent and/or received by at least two subcarriers with different subcarrier spacings, and/or used for indicating a data buffer capability of the terminal; and sending, by the terminal, the UE capability information to an access network device.

In the optional embodiments, the UE capability information includes: parallel computation capability information of Fast Fourier Transform (FFT) and/or Inverse Fast Fourier Transform (IFFT); or parallel computation capability information of current remaining Fast Fourier Transform (FFT) and/or Inverse Fast Fourier Transform (IFFT).

In the optional embodiments, the UE capability information includes: a space size of a data buffer; or a space size of current remaining data buffer.

In the optional embodiments, the UE capability information includes: uplink subcarrier spacings and uplink bandwidths supported to send in parallel by the terminal, at least two of the uplink subcarrier spacings being different; and/or downlink subcarrier spacings and downlink bandwidths supported to receive in parallel by the terminal, at least two of the downlink subcarrier spacings being different.

In the optional embodiments, before generating, by the terminal, the UE capability information, the method further includes:

receiving, by the terminal, first uplink subcarrier spacings and first uplink bandwidths and/or first downlink subcarrier spacings and first downlink bandwidths supported by a camped cell sent by the access network device;

generating, by the terminal, the UE capability information includes:

generating, by the terminal, the UE capability information which includes: second uplink subcarrier spacings and second uplink bandwidths, and/or second downlink subcarrier spacings and second downlink bandwidths;

wherein the camped cell is a cell in which the terminal camps currently, the second uplink subcarrier spacings and the second uplink bandwidths are a subset of the first uplink subcarrier spacings and the first uplink bandwidths, and the second downlink subcarrier spacings and the second downlink bandwidths are a subset of the first downlink subcarrier spacings and first downlink bandwidths.

In the optional embodiments, receiving, by the terminal, the first uplink subcarrier spacings and the first uplink bandwidths and/or the first downlink subcarrier spacings and the first downlink bandwidths supported by the camped cell sent by the access network device, includes:

receiving, by the terminal, system information sent by the access network device; and retrieving, by the terminal, the first uplink subcarrier spacings and the first uplink bandwidths, and/or the first downlink subcarrier spacings and the first downlink bandwidths supported by the camped cell from a predetermined system information block in the system information.

In the optional embodiments, before sending, by the terminal, the UE capability information to the access network device, the method further includes:

receiving, by the terminal, a UE capability enquiry sent by the access network device.

According to a second aspect of the present disclosure, there is provided an information receiving method, including:

receiving, by an access network device, UE capability information sent by a terminal, the UE capability information being used for indicating a parallel processing capability of the terminal for signals sent and/or received by at least two subcarriers with different subcarrier spacings, and/or used for indicating a data buffer capability of the terminal.

In the optional embodiments, the UE capability information includes: parallel computation capability information of Fast Fourier Transform (FFT) and/or Inverse Fast Fourier Transform (IFFT); or parallel computation capability information of current remaining Fast Fourier Transform (FFT) and/or Inverse Fast Fourier Transform (IFFT).

In the optional embodiments, the UE capability information includes: a space size of a data buffer; or a space size of current remaining data buffer.

In the optional embodiments, the UE capability information includes:

uplink subcarrier spacings and uplink bandwidths supported to send in parallel by the terminal, at least two of the uplink subcarrier spacings are different;

and/or, downlink subcarrier spacings and downlink bandwidths supported to receive in parallel by the terminal, at least two of the downlink subcarrier spacings are different.

In the optional embodiments, before receiving, by the access network device, the UE capability information sent by the terminal, the method further includes:

sending, by the access network device, first uplink subcarrier spacings and first uplink bandwidths and/or first downlink subcarrier spacings and first downlink bandwidths supported by a camped cell to the terminal;

receiving, by the access network device, the UE capability information sent by the terminal includes:

receiving, by the access network device, the UE capability information sent by the terminal, the UE capability information including: second uplink subcarrier spacings and second uplink bandwidths, and/or second downlink subcarrier spacings and second downlink bandwidths;

wherein the camped cell is a cell in which the terminal camps currently, the second uplink subcarrier spacings and the second uplink bandwidths are a subset of the first uplink subcarrier spacings and the first uplink bandwidths, the second downlink subcarrier spacings and the second downlink bandwidths are a subset of the first downlink subcarrier spacings and first downlink bandwidths.

In the optional embodiments, sending, by the access network device, the first uplink subcarrier spacings and the first uplink bandwidths and/or first downlink subcarrier spacings and first downlink bandwidths supported by the camped cell to the terminal, includes:

sending, by the access network device, system information to the terminal, and a predetermined system information block in the system information carries the first uplink subcarrier spacings and the first uplink bandwidths and/or the first downlink subcarrier spacings and the first downlink bandwidths supported by the camped cell.

In the optional embodiments, before receiving, by the access network device, the UE capability information sent by the terminal, the method further includes:

sending, by the access network device, a UE capability enquiry to the terminal.

In the optional embodiments, after receiving, by the access network device, the UE capability information sent by the terminal, the method further includes:

scheduling, by the access network device, uplink transmission and/or downlink transmission of the terminal according to the UE capability information.

According to a third aspect of the present disclosure, there is provided an information sending apparatus, including at least one unit, which is configured to implement the information sending method provided by the first aspect described above or any one possible implementation of the first aspect.

According to a fourth aspect of the present disclosure, there is provided an information receiving apparatus, including at least one unit, which is configured to implement the information sending method provided by the second aspect described above or any one possible implementation of the second aspect.

According to a fifth aspect of the present disclosure, there is provided a terminal, which includes a processor, a memory, a sender and a receiver; the memory is configured to store one or more instructions, which are executed by the processor as indicated; the processor is configured to implement the information receiving method provided by the first aspect described above or any one possible implementation of the first aspect; the sender is configured to implement sending of the UE capability information, and the receiver is configured to implement receiving of the UE capability enquiry or the system information.

According to a sixth aspect of the present disclosure, there is provided an access network device, which includes a processor, a memory, a sender and a receiver; the memory is configured to store one or more instructions, which are executed by the processor as indicated; the processor is configured to implement the signal receiving method provided by the second aspect described above or any one possible implementation of the second aspect; the receiver is configured to implement receiving of the UE capability information, and the sender is configured to implement sending of the UE capability enquiry or the system information.

According to a seventh aspect of the present disclosure, there is provided a computer readable medium, which stores one or more instructions configured to implement the information sending method provided by the first aspect described above or any one possible implementation of the first aspect.

According to an eighth aspect of the present disclosure, there is provided a computer readable medium, which stores one or more instructions configured to implement the information receiving method provided by the second aspect described above or any one possible implementation of the second aspect.

The beneficial effect of the technical proposal provided by the embodiments of the present disclosure is as follows.

Through reporting the UE capability information to the access network device by the terminal, the access network device is able to know the capability of the terminal for processing the signals sent and/or received in parallel by at least two subcarriers with different subcarrier spacings, and then schedules the uplink/downlink transmission according to the actual processing capability of the terminal, so that the access network device can dynamically schedule the uplink/downlink transmission of the terminal according to different UE capabilities.

BRIEF DESCRIPTION OF THE DRAWINGS

In order to illustrate the technical solutions in the embodiments of the present disclosure more clearly, the accompanying drawings required by the embodiments for use of description will be described below. It is apparent that the drawings illustrated below are merely some embodiments of the present disclosure, and other drawings can be obtained according to these drawing by those skilled in the art without creative work.

DETAILED DESCRIPTION

In order to make the purpose, the technical solution and the advantages of the present disclosure more clear, the embodiments of the present disclosure will be further described in details below in combination with the drawings.

The term "module" mentioned herein generally refers to a program or instruction stored in a memory that is capable of performing certain functions; the term "unit" mentioned herein generally refers to a functional structure that is logically divided, and the "unit" may be implemented by pure hardware or a combination of hardware and software.

The term "a plurality of" mentioned herein means two or more. The term "and/or" describes the association relationship between the associated objects, indicating that there may be three types of relationships, for example, A and/or B may indicate that there are the following three cases: A exists separately, A and B exist at the same time, and B exists separately. The character "/" generally indicates that the associated objects have an "or" relationship.

Figure 1:
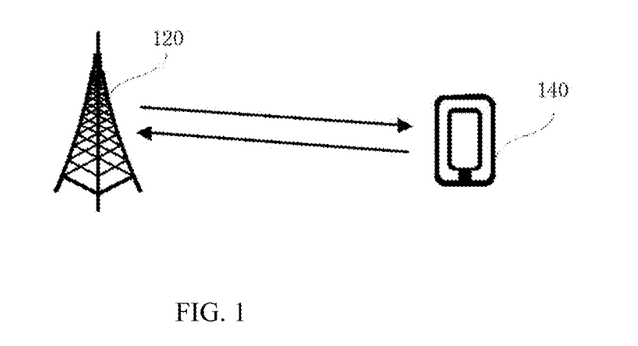
FIG. 1 is a structure diagram of a mobile communication system provided by an embodiment of the present disclosure.

FIG. 1 illustrates a structure diagram of a mobile communication system provided by an embodiment of the present disclosure. The mobile communication system may be a 5G system, which is also known as NR system. The mobile communication system includes: an access network device 120 and a terminal 140.

The access network device 120 may be a base station, which may be used to perform mutual conversion between the received wireless frame and IP packet, and coordinate attribute management of air interfaces. For example, the base station may be an evolutional Node B (eNB or e-NodeB) in the LTE, or a base station with centralized and distributed architecture in the 5G system. When adopting the centralized and distributed architecture, the access network device 120 generally includes a central unit (CU) and at least two distributed units (DU). Protocol stacks of Packet Data Convergence Protocol (PDCP) layer, Radio Link Control (RLC) layer and Media Access Control (MAC) layer are set in the CU; and the protocol stack of Physical (PHY) layer is set in the distributed units. The specific implementation manner of the access network device 120 is not limited by the embodiments of the present disclosure.

Wireless connection between the access network device 120 and the terminal 140 is established through a wireless air interface. Optionally, the wireless air interface is a wireless air interface based on the standard of the 5th generation mobile communication technology (5G), for example, the wireless air interface is a New Radio (NR); or the wireless air interface may also be a wireless air interface based on the standard of a next generation mobile communication technology of the 5G.

The terminal 140 may be a device that provides users with voice and/or data connectivity. The terminal may communicate with one or more core networks via Radio Access Network (RAN). The terminal 140 may be a mobile terminal such as a mobile phone (also referred to as a "cellular" phone) or a computer having a mobile terminal, for example, the terminal 140 may be a portable, pocket, or hand-held mobile apparatus, or a mobile apparatus built in the computer or a vehicle-mounted mobile apparatus, such as a Subscriber Unit, a Subscriber Station, a Mobile Station, a Mobile, a Remote Station, an Access Point, a Remote Terminal, an Access Terminal, a User Terminal, a User Agent, a User Device or User Equipment.

It should be noted that a plurality of access network devices 120 and/or a plurality of terminals 140 may be included in the mobile communication system shown in FIG. 1. One access network device 120 and one terminal 140 shown in FIG. 1 is illustrated, while the present disclosure is not limited thereto.

Figure 2:
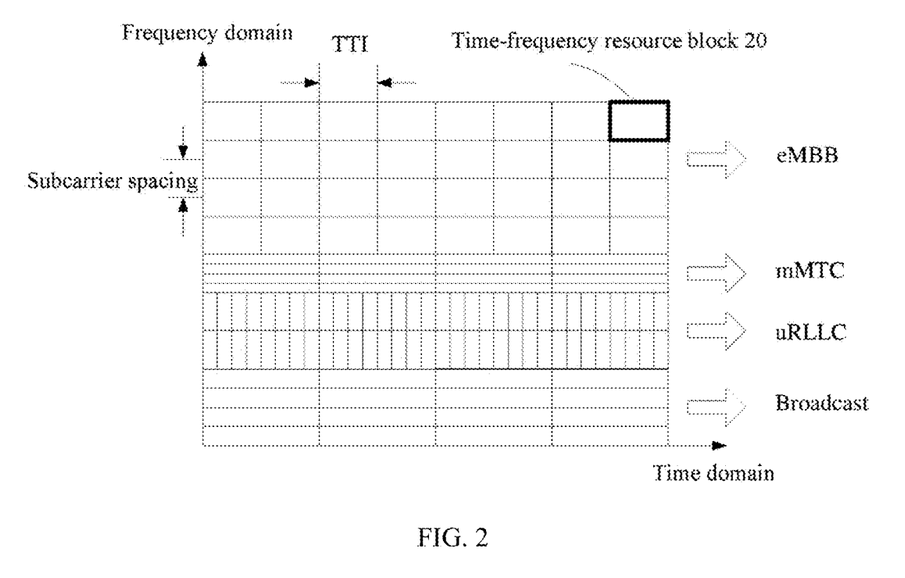
FIG. 2 is a schematic diagram of division of time-frequency resource blocks provided by an embodiment of the present disclosure.

The configurable subcarrier spacing and configurable Transmission Time Interval (TTI) are introduced in the 5G system. Different from the time-frequency resource blocks with the same size used in the LTE system, the flexibly configured time-frequency resource blocks with different sizes may be used in the 5G system. FIG. 2 illustrates a schematic diagram of a division of time-frequency resource blocks provided by an embodiment of the present disclosure. In FIG. 2, the horizontal axis shows time while the vertical axis shows frequency. Schematically:

in frequency domain, the time-frequency resource blocks 20 may be divided according to different subcarrier spacings, such as subcarrier spacing of 15 kHZ, 30 kHZ, 60 kHZ, 120 kHZ, 240 kHZ and so on. Optionally, the subcarrier with relatively small subcarrier spacing may be used in the massive Machine Type Communication (mMTC) service and Enhanced Mobile Broadband (eMBB) service; the subcarrier with medium subcarrier spacing may be used in the ultra-Reliable and Low Latency Communication (uRLLC) service; and the subcarrier with relatively large subcarrier spacing may be used in the services assigned in the high-frequency band, such as Broadcast service and Enhanced Mobile Broadband (eMBB) service.

In time domain, the time-frequency resource blocks 20 may be divided according to different TTIs. Optionally, TTI may be 1 ms, 0.5 ms, 0.06 ms and so on. Each TTI may be divided according to symbols, symbol groups, slots or sub-frames as well. For example, one TTI is divided into 2 slots, and one TTI is divided into 14 symbols, or even one TTI is divided into 4 symbols, or 3 symbols, or 2 symbols, etc.

When the access network terminal 120 transmits downlink data to the terminal 140 through downlink, the access network terminal 120 may send the downlink data in parallel by at least two subcarriers with different subcarrier spacings; and when the terminal 140 transmits uplink data to the access network terminal 120 through uplink, the terminal 140 may send the uplink data in parallel by at least two subcarriers with different subcarrier spacings.

Figure 3:
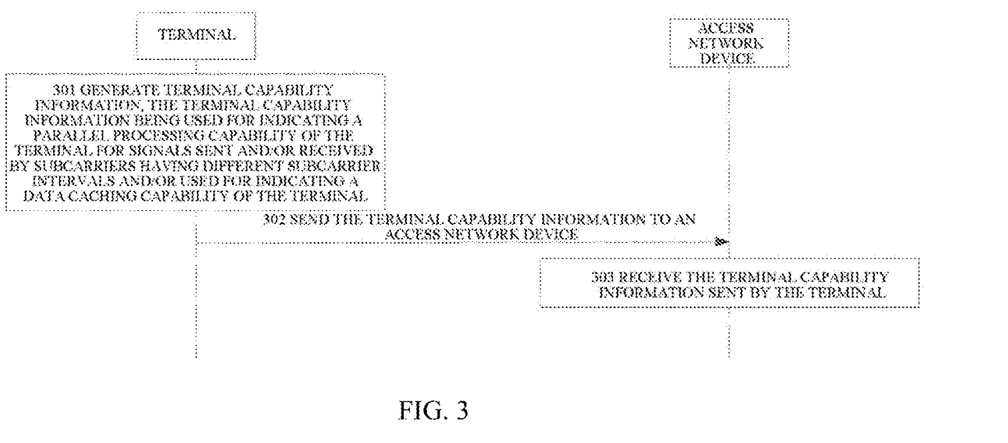
FIG. 3 is a flow chart of an information sending method provided by an embodiment of the present disclosure.

FIG. 3 illustrates a flow chart of an information sending method provided by an embodiment of the present disclosure. In the embodiment, it is illustrated that the information sending method is used in the mobile communication system shown in FIG. 1. The method includes the following steps.

In step 301, a terminal generates UE capability information, the UE capability information being used for indicating a parallel processing capability of the terminal for signals sent and/or received by at least two subcarriers with different subcarrier spacings, and/or used for indicating a data buffer capability of the terminal.

When adopting at least two subcarriers with different subcarrier spacings to send and/or receive signals, there are two implementation schemes for the terminal.

In the first implementation scheme, the signals sent and/or received by at least two subcarriers with different subcarrier spacings are processed in parallel.

A plurality of Inverse Fast Fourier Transform (IFFT) units and/or Fast Fourier Transform (FFT) units are pre-set in the terminal.

When adopting at least two subcarriers with different subcarrier spacings to send uplink data in parallel, the terminal uses the plurality of IFFT units to modulate in parallel; and when adopting at least two subcarriers with different subcarrier spacings to receive downlink data in parallel, the terminal uses the plurality of FFT units to demodulate in parallel.

The IFFT units and/or FFT units may be implemented by software, or may be implemented by hardware circuit. When the IFFT units and/or FFT units are implemented by software, the number and computing capability of the IFFT units and/or the FFT units in the terminal are dynamically variable; and when the IFFT units and/or FFT units are implemented by hardware circuit, the number and computing capability of the IFFT units and/or the FFT units in the terminal are generally fixed.

Optionally, the terminal generates UE capability information according to its parallel computing capability.

In the second implementation scheme, after caching the signals sent and/or received by at least two subcarriers with different subcarrier spacings, the terminal performs serial processing.

A soft buffer is provided in the terminal. When the terminal receives downlink data sent by at least two subcarriers with different subcarrier spacings in parallel, at least two uplink data are cached in the soft buffer and demodulated in turn in a serial manner; or, the terminal caches at least two uplink data to be sent in the soft buffer, and after modulating them in turn in a serial manner, sends them in parallel to the access network device using at least two subcarriers with different subcarrier spacings.

Optionally, the terminal generates the UE capability information according to its data buffer capability. The data buffer capability refers to the capability of caching the signals sent and/or received by at least two subcarriers with different subcarrier spacings.

In step 302, the terminal sends the UE capability information to an access network device.

Optionally, the terminal voluntarily sends the UE capability information to the access network device at a pre-agreed timing. For example, the terminal voluntarily reports the UE capability information to the access network device during a first attach process; or the terminal voluntarily reports the UE capability information to the access network device when the number of the FFT units implemented by software increases/decreases.

Optionally, the terminal sends the UE capability information to the access network device after it receives a UE Capability Enquiry sent by the access network device. For example, during the process of attach or Tracking Area Update (TAU), the access network device sends a UE capability enquiry to the terminal, and then the terminal reports the UE capability information to the access network device.

In step 303, the access network device receives the UE capability information sent by the terminal.

Optionally, the access network device schedules uplink/downlink transmission of the terminal according to the UE capability information.

Optionally, the access network device schedules uplink/downlink transmission of the terminal within the capability scope indicated by the UE capability information. Optionally, the uplink transmission and/or downlink transmission refers to parallel transmission implemented by at least two subcarriers with different subcarrier spacings.

In conclusion, in the information sending method provided by the present disclosure, the terminal reports the UE capability information to the access network device, and the access network device can learn a processing capability of the terminal for signals sent and/or received by the subcarriers having different subcarrier spacings and then schedules the uplink/downlink transmission of the terminal according to the actual processing capability of the terminal, so that the access network device can dynamically schedule the uplink/downlink transmission of the terminal according to different UE capabilities.

Figure 4:
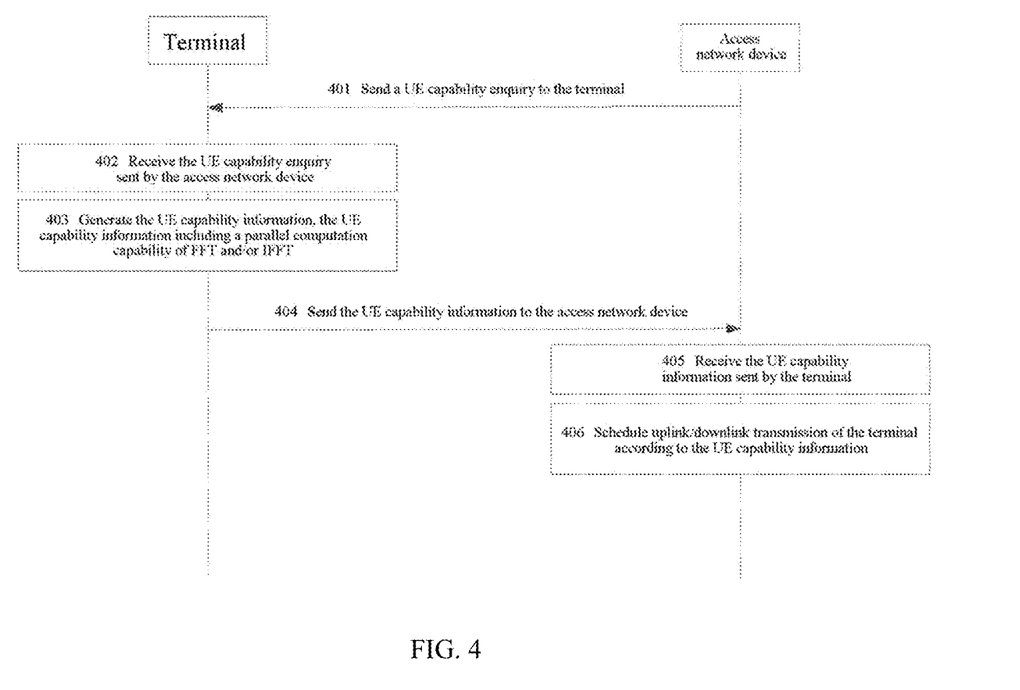
FIG. 4 is a flow chart of an information sending method provided by another embodiment of the present disclosure.
Figure 5:
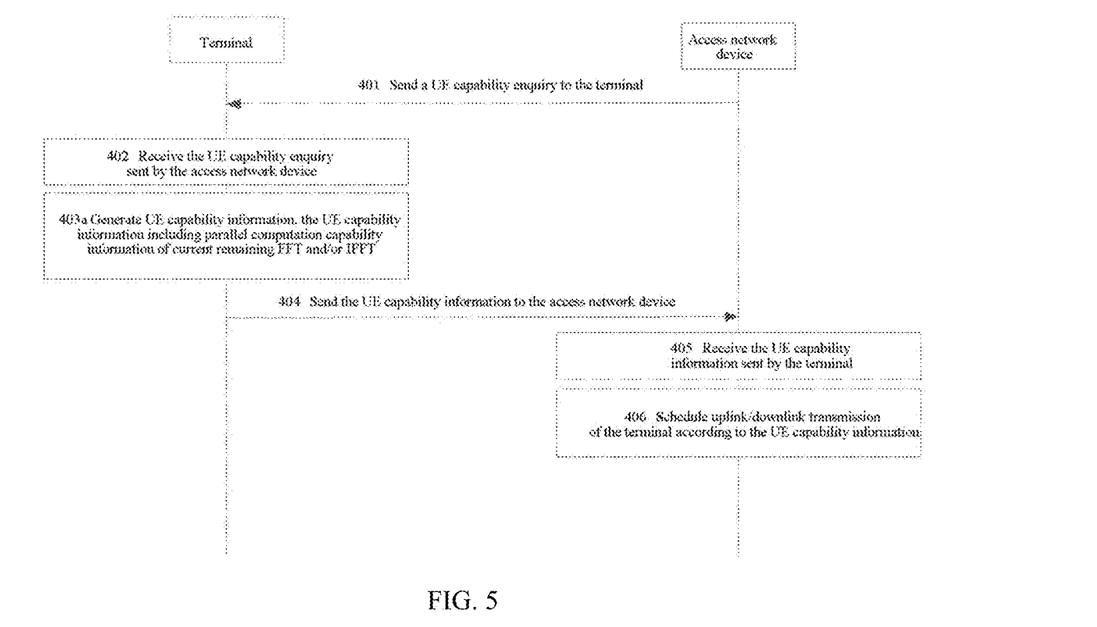
FIG. 5 is a flow chart of an information sending method provided by another embodiment of the present disclosure.
Figure 6:
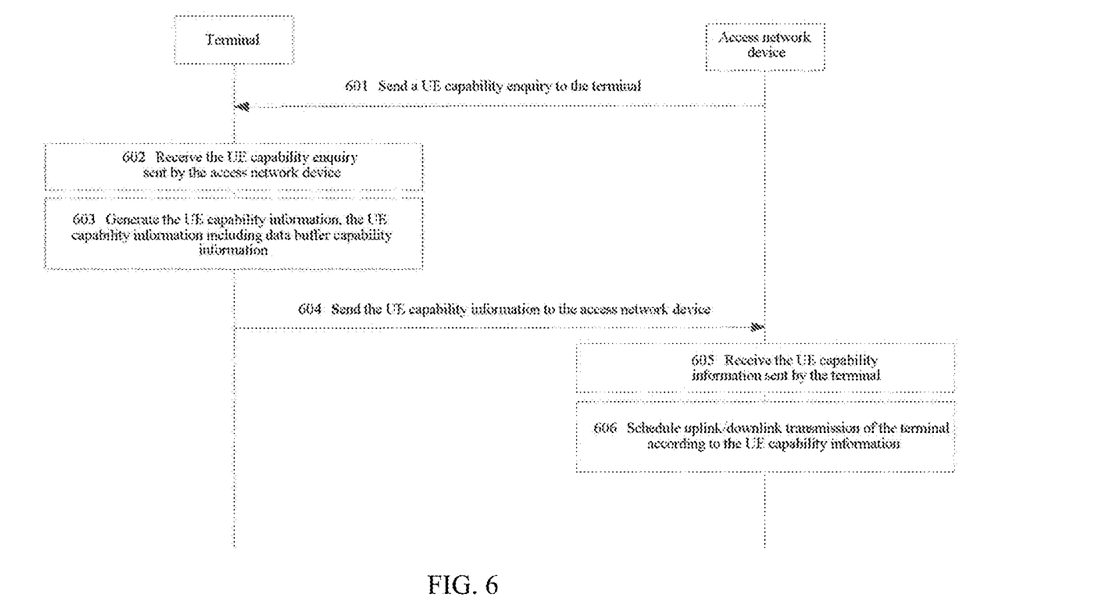
FIG. 6 is a flow chart of an information sending method provided by another embodiment of the present disclosure.

When measuring the capability of the terminals for processing the signals sent and/or received in parallel by at least two subcarriers with different subcarrier spacings, the UE capability information may be represented by at least three different manners. In the embodiments as below, FIG. 4 is taken as an example of the first representation manner; FIG. 5 is taken as an example of the second representation manner; and FIG. 6 is taken as an example of the second representation manner.

FIG. 4 illustrates a flow chart of an information sending method provided by another embodiment of the present disclosure. As shown in FIG. 4, the present embodiment is illustrated by taking the information sending method used in the mobile communication system shown in FIG. 2 as an example. The method includes the following steps.

In step 401, an access network device sends a UE capability enquiry to a terminal.

Optionally, during the process of attach or TAU of the terminal, the access network device sends a UE capability enquiry to the terminal via a Radio Resource Control (RRC) signaling or a Medium Access Control (MAC) signaling.

Optionally, the access network device sends a UE capability enquiry to the terminal via a RRC signaling or a MAC signaling before uplink scheduling or downlink scheduling.

In step 402, the terminal receives the UE capability enquiry sent by the access network device.

In the present embodiment, the timing of the access network device sending the UE capability enquiry to the terminal is not limited. In addition, if the terminal voluntarily reports the UE capability enquiry to the access network device, then step 401 and step 402 are skipped.

In step 403, the terminal generates UE capability information including a parallel computation capability information of Fast Fourier Transform (FFT) and/or Inverse Fast Fourier Transform (IFFT).

Since the signals carried by a plurality of subcarriers require to use the Orthogonal Frequency-Division Multiplexing (OFDM) technology, and parallel processing capability of the OFDM mainly depends on the computation capability of FFT and/or IFFT, the terminal may use the parallel computation capability information of the FFT units and/or the IFFT units to represent its capability of processing the signals carried by the plurality of subcarriers.

Optionally, the parallel computation capability information of the FFT units and/or IFFT units may be represented by the number of units and transformation point number of each unit. For example, four FFT units are set in the terminal, and each FFT unit is used to compute discrete Fourier transform of 1024 points, then the UE capability information is generated according to (4, 1024); for another example, two FFT units are set in the terminal, and each FFT unit is used to compute discrete Fourier transform of 2048 points, then the UE capability information is generated according to (2, 2048).

Optionally, "the number of units and transformation point number of each unit" in the present embodiment refers to the unit number of all the FFT units and transformation point number of each FFT unit in the terminal, and/or the number of all the IFFT units and transformation point number of each IFFT unit in the terminal.

In step 404, the terminal sends the UE capability information to the access network device.

Optionally, the terminal sends the UE capability information to the access network device via a RRC signaling or a MAC signaling.

In step 405, the access network device receives the UE capability information sent by the terminal.

Optionally, the access network device receives the UE capability information via a RRC signaling or a MAC signaling.

In step 406, the access network device schedules uplink transmission and/or downlink transmission of the terminal according to the UE capability information.

For example, the UE capability information is used to indicate that four FFT units are set in the terminal, and each FFT unit is used to compute discrete Fourier transform of 1024 points, then the access network device schedules at most 4 subcarriers with different subcarrier spacings for the terminal to receive downlink data in parallel, and the downlink data carried by each subcarrier does not beyond the computing capability of the FFT unit of 1024 points.

For another example, the UE capability information is used to indicate that two FFT units are set in the terminal, and each FFT unit is used to compute discrete Fourier transform of 2048 points, then the access network device schedules at most 2 subcarriers with different subcarrier spacings for the terminal to send downlink data in parallel, and the downlink data carried by each subcarrier does not beyond the computing capability of the FFT unit of 2048 points.

In conclusion, in the information sending method provided by the present embodiment, through adopting the number of units and transformation point number of each unit of the FFT units and/or IFFT units to represent the capability of the terminal for processing the signals carried by at least two subcarriers with different subcarrier spacings in parallel, the access network device can learn the parallel processing capability of the terminal for signals sent and/or received by the subcarriers having different subcarrier spacings and then schedules the uplink/downlink transmission of the terminal according to the actual processing capability of the terminal, so that the access network device can dynamically schedule the uplink/downlink transmission of the terminal according to different UE capabilities.

In the optional embodiment based on the FIG. 4, the terminal may be sending uplink data, and a part of the IFFT units are in a state of being occupied; or, the terminal may be receiving downlink data, and a part of the FFT units are in a state of being occupied. At this time, the terminal generates the UE capability information according to the parallel computation capability of the current remaining FFT units and/or IFFT units, and step 403a may be implemented instead of the step 403 described above, which is shown as FIG. 5.

In step 403a, the terminal generates the UE capability information which includes: the computation capability information of current remaining parallel FFT units and/or IFFT units.

Optionally, the parallel computation capability of the current remaining FFT units and/or IFFT units may be represented by the number of units and transformation point number of each unit. For example, four FFT units are set in the terminal, each FFT unit is used to compute discrete Fourier transform of 1024 points, and currently two FFT units are in a state of being occupied, then the UE capability information is generated according to (4−2=2, 1024).

For another example, two FFT units are set in the terminal, each FFT unit is used to compute discrete Fourier transform of 2046 points, and currently one FFT unit is in a state of being occupied, then the UE capability information is generated according to (1, 2046).

Optionally, the unit number of the current remaining FFT units=the unit number of all FFT units−the number of FFT units in the state of being occupied; and the unit number of the current remaining IFFT units=the unit number of all IFFT units−the number of IFFT units in the state of being occupied.

For example, the access network device has scheduled a first subcarrier and a second subcarrier to receive downlink data for the terminal, when it is required to schedule a third subcarrier to receive downlink data for the terminal, the access network device enquires about the unit number and transformation point number of the current remaining FFT units, and schedules downlink transmission for the terminal according to the unit number and transformation point number of the current remaining FFT units.

It should be noted that when the access network device needs to enquire the terminal about the current remaining parallel computing capability, the UE capability enquiry sent by the access network device to the terminal may be the same as the UE capability enquiry in the step 401, or may be different from the UE capability enquiry in the step 401, and the embodiment of the present disclosure is not limited thereto.

FIG. 6 illustrates a flow chart of an information sending method provided by another embodiment of the present disclosure. As shown in FIG. 6, the present embodiment is illustrated by taking the information sending method used in the mobile communication system shown in FIG. 1 as an example. The method includes the following steps.

In step 601, an access network device sends a UE capability enquiry to a terminal.

Optionally, during the process of attach or TAU of the terminal, the access network device sends a UE capability enquiry to the terminal via a RRC signaling or a MAC signaling.

Optionally, the access network device sends a UE capability enquiry to the terminal via a RRC signaling or a MAC signaling before uplink scheduling or downlink scheduling.

In step 602, the terminal receives the UE capability enquiry sent by the access network device.

In the present embodiment, the timing of the access network device sending the UE capability enquiry to the terminal is not limited. In addition, if the terminal voluntarily reports the UE capability enquiry to the access network device, then step 601 and step 602 are skipped.

In step 603, the terminal generates UE capability information, the UE capability information including: data buffer capability information.

Optionally, a soft buffer is set in the terminal, and the soft buffer is used to cache the signals carried by at least two subcarriers with different subcarrier spacings. When the soft buffer has a large storage capacity, the terminal caches a plurality of uplink data, and then performs processing on the plurality of uplink data in a serial manner; or the terminal caches the plurality of downlink data received in parallel, and then performs processing on the plurality of downlink data in a serial manner.

Optionally, the data buffer capability is represented by a space size of the soft buffer, such as XX bits.

In step 604, the terminal sends the UE capability information to the access network device.

Optionally, the terminal sends the UE capability information to the access network device via RRC signaling or MAC signaling.

In step 605, the access network device receives the UE capability information sent by the terminal.

Optionally, the access network device receives the UE capability information via a RRC signaling or a MAC signaling.

In step 606, the access network device schedules uplink/downlink transmission of the terminal according to the UE capability information.

For example, the UE capability information is used to indicate that the data buffer capability of the terminal is 4*X bits, then the access network device schedules at most 4 subcarriers with different subcarrier spacings for the terminal to receive downlink data at the same time.

For example, the UE capability information is used to indicate that the data buffer capability of the terminal is 2*X bits, then the access network device schedules at most four subcarriers with different subcarrier spacings for the terminal to send uplink data at the same time.

In conclusion, in the information sending method provided by the present disclosure, through adopting the space size of the soft buffer to represent the capability of the terminal for processing the signals carried by subcarriers with different subcarrier spacings, the access network device can learn the data buffer capability of the terminal for signals sent and/or received by at least subcarriers having different subcarrier spacings and then schedules the uplink/downlink transmission according to the data buffer capability of the terminal, so that the access network device can dynamically schedule the uplink/downlink transmission of the terminal according to different UE capabilities.

In an optional embodiment based on FIG. 6, the terminal may be sending uplink data, and a part of soft buffer is in a state of being occupied; or, the terminal may be receiving downlink data, and a part of soft buffer is in a state of being occupied. At this time, the terminal generates the UE capability information according to the current remaining soft buffer, and step 603a may be implemented instead of the step 603 described above, which is shown as FIG. 7.

Figure 7:
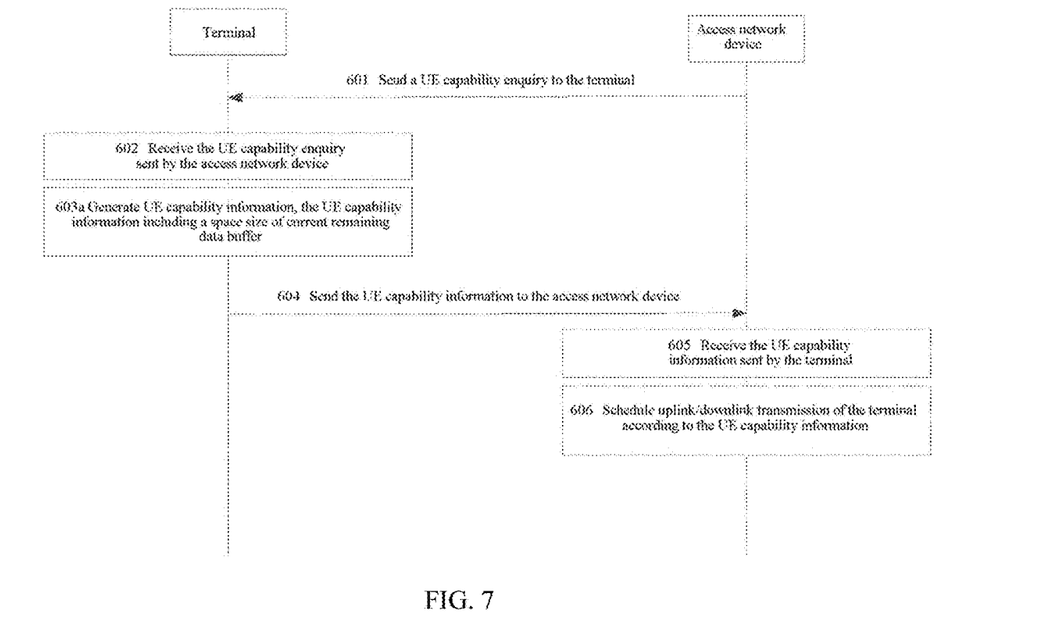
FIG. 7 is a flow chart of an information sending method provided by another embodiment of the present disclosure.

In step 603a, the terminal generates the UE capability information, the UE capability information including: a space size of current remaining data buffer.

Optionally, the space size of the current remaining data buffer may be represented by bits. For example, 4*A bits of soft buffer are set in the terminal, and when 1*A bits of soft buffer are in a state of being occupied, then the terminal generates the UE capability according to 3*A bits.

Optionally, the space size of the current remaining data buffer=the space size of all data buffer−the space size of the data buffer in the state of being occupied.

For example, the access network device has scheduled a first subcarrier and a second subcarrier to receive downlink data for the terminal, when needing to schedule a third subcarrier to receive downlink data for the terminal, the access network device enquires the terminal about the space size of the current remaining data buffer, and schedules downlink transmission for the terminal according to the space size of the current remaining data buffer.

It should be noted that when the access network device needs to enquire the terminal about the current remaining data buffer capability, the UE capability enquiry sent by the access network device to the terminal may be the same as the UE capability enquiry in the step 601, or may be different from the UE capability enquiry in the step 601, and the embodiment of the present disclosure is not limited thereto.

Different from the embodiments shown in FIG. 4 and FIG. 5, the terminal may also adopt subcarrier spacings and bandwidths supported by the terminal to represent its parallel processing capability on the signals carried by a plurality of subcarriers. For this, the embodiment shown in FIG. 8 may be referred to.

Figure 8:
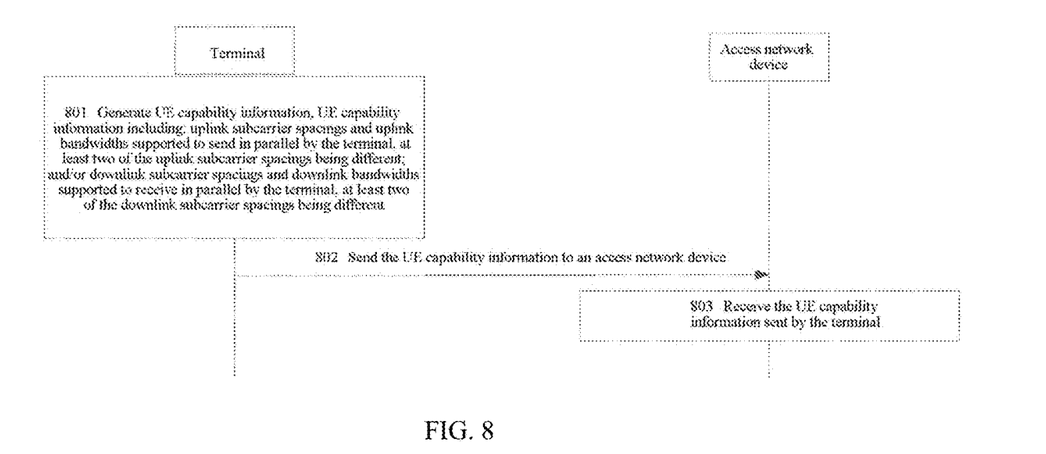
FIG. 8 is a flow chart of an information sending method provided by another embodiment of the present disclosure.

FIG. 8 illustrates a flow chart of an information sending method provided by an embodiment of the present disclosure. As shown in FIG. 8, the present embodiment is illustrated by taking the information sending method used in the mobile communication system shown in FIG. 1 as an example. The method includes the following steps.

In step 801, a terminal generates UE capability information, the UE capability information including: uplink subcarrier spacings and uplink bandwidths supported to send in parallel by the terminal, where at least two uplink subcarrier spacings are different; and/or downlink subcarrier spacings and downlink bandwidths supported to receive in parallel by the terminal, where at least two downlink subcarrier spacings are different.

Optionally, subcarrier spacings and bandwidths supported by different terminals are different. The subcarrier spacings and bandwidths supported by the terminal are stored in the terminal, and at least two uplink subcarrier spacings are different. The uplink bandwidths supported by the terminal are positively correlated with the transformation point number of IFFT, while the downlink bandwidths supported by the terminal are positively correlated with the transformation point number of FFT. Subcarrier spacings and bandwidths supported by the terminal are shown in Table 1 for illustration.

TABLE 1

| Uplink | |
| --- | --- |
| Subcarrier Spacing (SCS) | Bandwidth (BW) |
| SCS1 | BW1 |
| SCS2 | BW2 |
| ... | ... |
| SCS10 | BW10 |
| Downlink | |
| Subcarrier Spacing | Bandwidth |
| SCS3 | BW3 |
| SCS4 | BW4 |
| ... | ... |
| SCS10 | BW10 |

Optionally, the subcarrier spacings are power of 2 times of 15 kHZ, such as 15 kHZ, 30 kHZ, 60 kHZ, 120 kHZ, 240 kHZ, etc.

In step 802, the terminal sends the UE capability information to an access network device.

Optionally, the terminal voluntarily sends the UE capability information to the access network device at a pre-agreed timing. For example, the terminal voluntarily reports the UE capability information to the access network device during a first attach process.

Optionally, the terminal sends the UE capability information to the access network device after it receives a UE capability enquiry sent by the access network device. For example, during the process of attach or TAU, the access network device sends a UE capability enquiry to the terminal, and then the terminal reports the UE capability information to the access network device.

In step 803, the access network device receives the UE capability information sent by the terminal.

Optionally, the access network device schedules uplink/downlink transmission of the terminal according to the UE capability information. The access network device schedules uplink transmission of the terminal according to the uplink subcarrier spacings and uplink bandwidths supported by the terminal; and the access network device schedules downlink transmission of the terminal according to the downlink subcarrier spacings and downlink bandwidths supported by the terminal.

Optionally, the access network device schedules uplink and/or downlink transmission of the terminal within the capability scope indicated by the UE capability information. Optionally, the uplink transmission and/or downlink transmission refers to parallel transmission implemented by at least two subcarriers with different subcarrier spacings.

In conclusion, in the information sending method provided by the present disclosure, through adopting subcarrier spacings and bandwidths supported by the terminal to represent the capability of the terminal for processing the signals carried by subcarriers with different subcarrier spacings in parallel, the access network device can obtain subcarrier spacings and bandwidths supported by the terminal and then schedules the uplink/downlink transmission according to the subcarrier spacings and bandwidths supported by the terminal, so that the access network device can dynamically schedule the uplink/downlink transmission of the terminal according to different UE capabilities.

Figure 9:
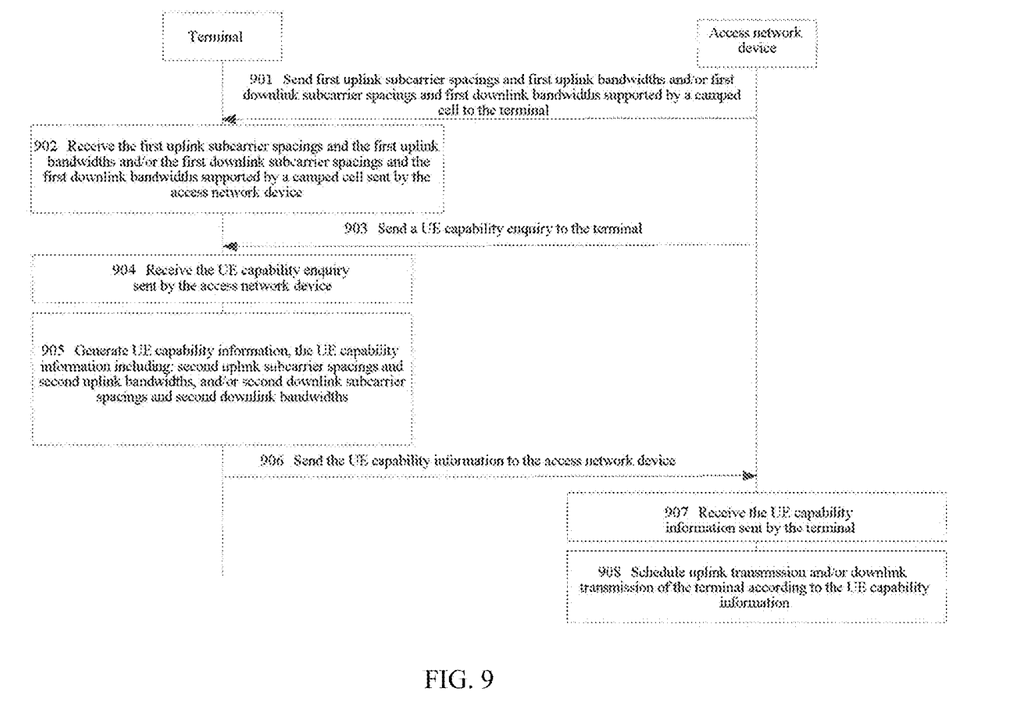
FIG. 9 is a flow chart of an information sending method provided by another embodiment of the present disclosure.

FIG. 9 illustrates a flow chart of an information sending method provided by an embodiment of the present disclosure. As shown in FIG. 9, the present embodiment is illustrated by taking the information sending method used in the mobile communication system shown in FIG. 1 as an example. As an optional embodiment based on FIG. 8, the method includes the following steps.

In step 901, an access network device sends first uplink subcarrier spacings and first uplink bandwidths and/or first downlink subcarrier spacings and first downlink bandwidths supported by a camped cell to a terminal.

Optionally, the camped cell is a cell in which the terminal camps currently. In the 5G system, the terminal may camp in more than one cell.

The access network device is stored with first uplink subcarrier spacings and first uplink bandwidths and first downlink subcarrier spacings and first downlink bandwidths supported by each cell.

Optionally, the access network device sends the first uplink subcarrier spacings and the first uplink bandwidths and/or the first downlink subcarrier spacings and the first downlink bandwidths supported by the camped cell in the system information to the terminal. When the system information includes a plurality of System Information Blocks (SIB), the access network device sends the subcarrier spacings and bandwidths supported by the camped cell in a predetermined SIB.

Optionally, the access network device sends the subcarrier spacings and bandwidths supported by the camped cell in a Broadcast Channel (BCh). Or, the access network device separately sends the subcarrier spacings and bandwidths supported by the camped cell to the terminal in a manner of beam forming, and the embodiment is not limited thereto. Optionally, in a manner of other SI, the access network device sends the first uplink subcarrier spacings and the first uplink bandwidths and/or the first downlink subcarrier spacings and the first downlink bandwidths supported by the camped cell to the terminal.

The first uplink subcarrier spacings and the first uplink bandwidths, and the first downlink subcarrier spacings and the first downlink bandwidths sent by the access network device are shown in Table 1 for illustration.

In step 902, the terminal receives the first uplink subcarrier spacings and the first uplink bandwidths and/or the first downlink subcarrier spacings and the first downlink bandwidths supported by the camped cell sent by the access network device.

Optionally, the terminal receives the system information sent by the access network device; from the predetermined SIB in the system information, the terminal acquires the first uplink subcarrier spacings and the first uplink bandwidths and/or the first downlink subcarrier spacings and the first downlink bandwidths supported by the camped cell.

In step 903, the access network device sends a UE capability enquiry to the terminal.

Optionally, during the process of attach or TAU of the terminal, the access network device sends a UE capability enquiry to the terminal via a Radio Resource Control (RRC) signaling or a Medium Access Control (MAC) signaling.

Optionally, the access network device sends a UE capability enquiry to the terminal via a RRC signaling or a MAC signaling before uplink scheduling or downlink scheduling.

In step 904, the terminal receives the UE capability enquiry sent by the access network device.

In the present embodiment, the timing of the access network device sending the UE capability enquiry to the terminal is not limited. In addition, if the terminal voluntarily reports the UE capability information to the access network device, then step 903 and step 904 will be skipped.

In step 905, the terminal generates UE capability information, the UE capability information including: second uplink subcarrier spacings and second uplink bandwidths and/or second downlink subcarrier spacings and second downlink bandwidths.

When the terminal receives the first uplink subcarrier spacings and the first uplink bandwidths supported by the camped cell, it will select the second uplink subcarrier spacings and the second uplink bandwidths supported by the terminal from a group of the first uplink subcarrier spacings and the first uplink bandwidths, that is, the group of the second uplink subcarrier spacings and the second uplink bandwidths is a part of the group of the first uplink subcarrier spacings and the first uplink bandwidths.

When the terminal receives the first downlink subcarrier spacings and the first downlink bandwidths supported by the camped cell, it will select the second downlink subcarrier spacings and the second downlink bandwidths supported by the terminal from the group of the first downlink subcarrier spacings and the first downlink bandwidths, that is, the group of the second downlink subcarrier spacings and the second downlink bandwidths is a part of the group of the first downlink subcarrier spacings and the first downlink bandwidths.

The second uplink subcarrier spacings and the second uplink bandwidths, and the second downlink subcarrier spacings and the second downlink bandwidths selected by the terminal are shown in Table 2 for illustration.

TABLE 2

| Uplink | |
| --- | --- |
| Subcarrier Spacing (SCS) | Bandwidth (BW) |
| SCS2 | BW2 |
| SCS4 | BW4 |
| SCS8 | BW8 |

| Downlink | |
| --- | --- |
| Subcarrier Spacing | Bandwidth |
| SCS3 | BW3 |
| SCS4 | BW4 |
| SCS8 | BW8 |
| SCS10 | BW10 |

The second uplink subcarrier spacings and the second uplink bandwidths are a subset of the first uplink subcarrier spacings and the first uplink bandwidths, and the second downlink subcarrier spacings and the second downlink bandwidths are a subset of the first downlink subcarrier spacings and first downlink bandwidths.

In step 906, the terminal sends the UE capability information to the access network device.

Optionally, the terminal sends the UE capability information to the access network device via a RRC signaling or a MAC signaling.

In step 907, the access network device receives the UE capability information sent by the terminal.

Optionally, the access network device receives the UE capability information via a RRC signaling or a MAC signaling.

In step 908, the access network device schedules uplink transmission and/or downlink transmission of the terminal according to the UE capability information.

After receiving the second uplink subcarrier spacings and the second uplink bandwidths supported by the terminal, the access network device schedules the uplink transmission of the terminal within the second uplink subcarrier spacings and the second uplink bandwidths supported by the terminal; and after receiving the second downlink subcarrier spacings and the second downlink bandwidths supported by the terminal, the access network device schedules the downlink transmission of the terminal within the second downlink subcarrier spacings and the second downlink bandwidths supported by the terminal.

In conclusion, in the information sending method provided by the present disclosure, through adopting subcarrier spacings and bandwidths supported by the terminal to represent the capability of the terminal for processing the signals carried by subcarriers with different subcarrier spacings in parallel, the access network device can obtain subcarrier spacings and bandwidths supported by the terminal and then schedules the uplink/downlink transmission of the terminal according to the subcarrier spacings and bandwidths supported by the terminal, so that the access network device can dynamically schedule the uplink/downlink transmission of the terminal according to different UE capabilities.

In the present embodiment, the first subcarrier spacings and the first bandwidths supported by the camped cell are also broadcast by the access network device to the terminal, and then the terminal selects the second subcarrier spacings and the second bandwidths from the first subcarrier spacings and the first bandwidths. Since the second subcarrier spacings and the second bandwidths are a subset of the first subcarrier spacings and the first bandwidths, the present embodiment can reduce data quantity of the UE capability information reported by the terminal, and save wireless communication resources.

A point that needs to be noted is that the steps implemented by the terminal in each embodiment mentioned above can be individually implemented as an information sending method for the terminal side, while the steps implemented by the access network device in each embodiment mentioned above can be individually implemented as an information sending method for the access network device side.

Another point that needs to be noted is that a combination of any two or three, or other combinations of the embodiments mentioned above can be implemented, for example, the UE capability information includes parallel computation capability information of Fast Fourier Transform (FFT) and Inverse Fast Fourier Transform (IFFT), and a space size of a data buffer at the same time, which is easy for those skilled in the art to think of based on the contents disclosed by the embodiments mentioned above and will not be elaborated in the present disclosure.

The following is an apparatus embodiment of the embodiments of the present disclosure. For the parts that are not elaborated in the apparatus embodiment, the technical details disclosed in the foregoing method embodiments may be used for reference.

Figure 10:
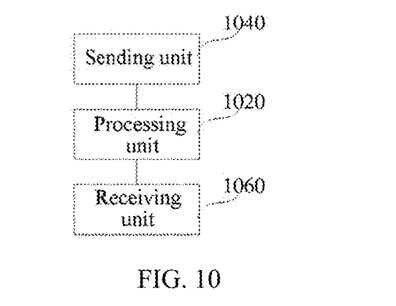
FIG. 10 is a structure diagram of an information sending apparatus provided by another embodiment of the present disclosure.

FIG. 10 illustrates a structure diagram of an information sending apparatus provided by an embodiment of the present disclosure. As shown in FIG. 10, the information sending apparatus may be implemented by software, hardware or a combination of them to form a whole terminal or a part of a terminal. The information sending apparatus includes: a processing unit 1020 and a sending unit 1040.

The processing unit 1020 is configured to execute any one generating step among step 301, step 403, step 403*a*, step 603, step 603*a*, step 801 and step 805 which are mentioned above.

The sending unit 1040 is configured to execute any one sending step among step 302, step 404, step 604, step 802 and step 906 which are mentioned above.

Optionally, the information sending apparatus also includes: a receiving unit 1060.

The receiving unit 1060 is configured to execute any one receiving step among step 402, step 602, step 902 and step 904 which are mentioned above.

Figure 11:
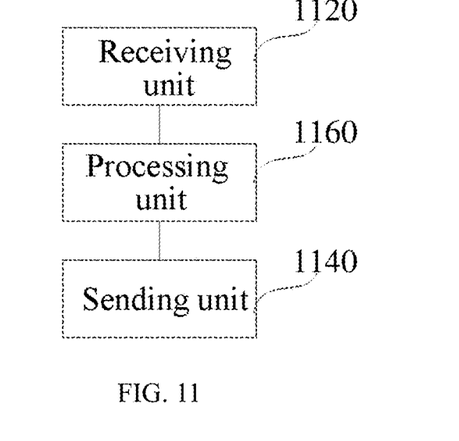
FIG. 11 is a structure diagram of an information receiving apparatus provided by another embodiment of the present disclosure.

FIG. 11 illustrates a structure diagram of an information receiving apparatus provided by an embodiment of the present disclosure. As shown in FIG. 11, the information receiving apparatus may be implemented by software, hardware or a combination of them to form the whole access network device or a part of the access network device. The information receiving apparatus includes: a receiving unit 1120.

The receiving unit 1120 is configured to execute any one receiving step among step 303, step 405, step 605, step 803 and step 807 which are mentioned above.

Optionally, the information receiving apparatus also includes: a sending unit 1140 and a processing unit 1160.

The sending unit 1140 is configured to execute any one sending step among step 401, step 601, step 901 and step 903 which are mentioned above.

The processing unit 1160 is configured to execute any one scheduling step among step 404, step 606 and step 908 which are mentioned above.

Figure 12:
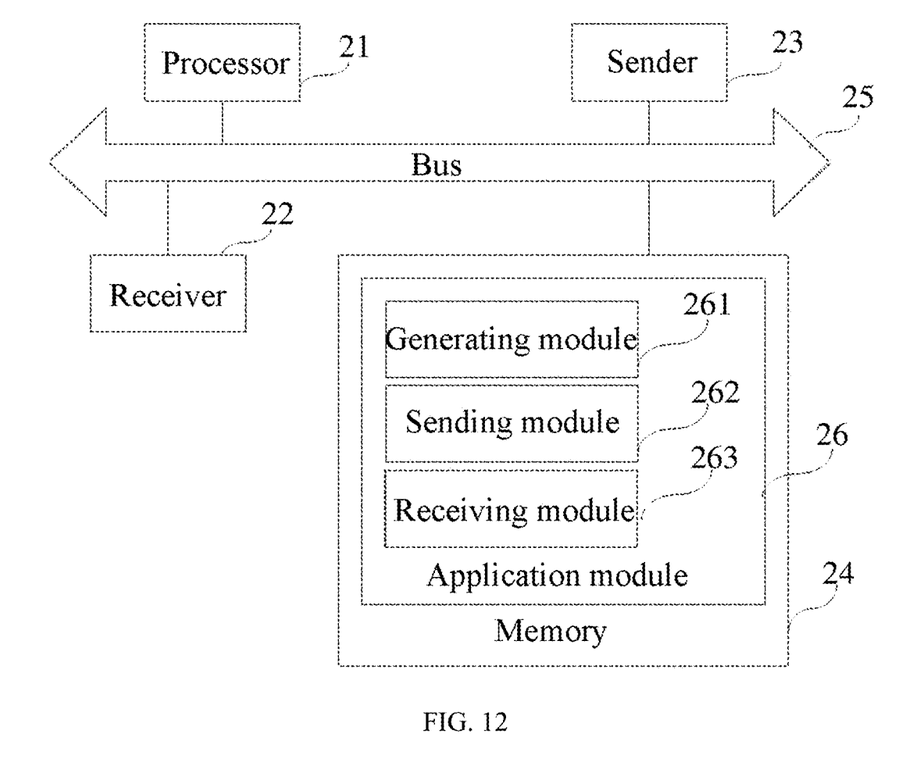
FIG. 12 is a structure diagram of a terminal provided by another embodiment of the present disclosure.

FIG. 12 illustrates a structure diagram of a sending device provided by an exemplary embodiment of the present disclosure. As shown in FIG. 12, the sending device includes: a processor 21, a receiver 22, a sender 23, a memory 24 and a bus 25.

The processor 21 includes one or more central processing cores. The processor 21 executes varies functional applications and information processes by running software programs and modules.

The receiver 22 and the sender 23 may be implemented as a communication component, which may be a communication chip. The communication chip may include a receiving module, a sending module and a modulating-demodulating module, and is configured to modulate and/or demodulate the information, and receive or send the information via wireless signals.

The memory 24 is connected to the processor 21 by the bus 25.

The memory 24 may be configured to store software programs and modules.

The memory 24 may store an application module 26 with at least one function. The application module 26 may include: a generating module 261, a sending module 262 and a receiving module 263.

The processor 21 is configured to execute the generating module 261 to implement the functions related to the generating steps in each method embodiment mentioned above; the processor 21 is configured to execute the sending module 262 to implement the functions related to the sending steps in each method embodiment mentioned above; and the processor 21 is configured to execute the receiving module 263 to implement the functions related to the receiving steps in each method embodiment mentioned above.

Furthermore, the memory 24 may be implemented by any type of volatile or non-volatile storage device or a combination of them, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a compact disk.

Figure 13:
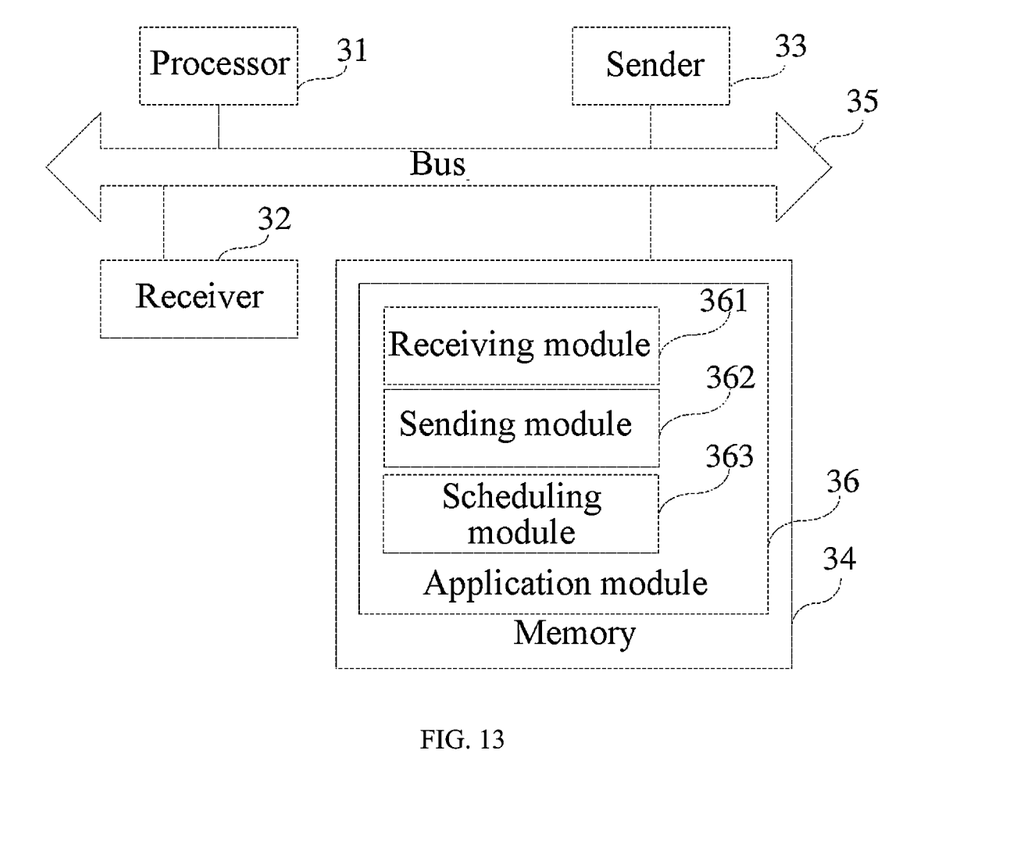
FIG. 13 is a structure diagram of an access network device provided by another embodiment of the present disclosure.

FIG. 13 illustrates a structure diagram of a receiving device provided by an exemplary embodiment of the present disclosure. As shown in FIG. 13, the receiving device includes: a processor 31, a receiver 32, a sender 33, a memory 34 and a bus 35.

The processor 31 includes one or more central processing cores. The processor 31 executes varies functional applications and information processes by running software programs and modules.

The receiver 32 and the sender 33 may be implemented as a communication component, which may be a communication chip. The communication chip may include a receiving module, a sending module and a modulating-demodulating module, and is configured to modulate and/or demodulate information, and receive or send the information via wireless signals.

The memory 34 is connected to the processor 31 by the bus 35.

The memory 34 may be configured to store software programs and modules.

The memory 34 may store an application module 36 with at least one function. The application module 36 may include: a receiving module 361, a sending module 362 and a scheduling module 363.

The processor 31 is used to execute the receiving module 361 to implement the functions related to the receiving steps in each method embodiment mentioned above; the processor 31 is used to execute the sending module 362 to implement the functions related to the sending steps in each method embodiment mentioned above; the processor 31 is used to execute the scheduling module 363 to implement the functions related to the scheduling steps in each method embodiment mentioned above.

Furthermore, the memory 34 may be implemented by any type of volatile or non-volatile storage device or a combination of them, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a compact disk.

Those skilled in the art should notice that in one or more of the above examples, the functions described in the embodiments of the present disclosure may be implemented by hardware, software, firmware, or any combination thereof. When being implemented by software, the functions may be stored in a computer readable medium or transmitted as one or more instructions or codes on a computer readable medium. The computer readable medium includes both computer storage medium and communication medium, of which the communication medium includes any medium that is convenient for transmitting a computer program from one place to another. A storage medium may be any available medium that can be accessed by a general purpose or special purpose computer.

Those described above are merely preferred embodiments of the present disclosure, and are not intended to limit the present disclosure. Any amendments, equivalent substitution, and improvement made within the spirit and principle of the present disclosure shall fall within the protection scope of the present disclosure.

What is claimed is:

1. An information sending method, comprising:
generating, by a terminal, terminal capability information, the terminal capability information being used for indicating the terminal to transmit at least two signals in parallel, wherein the at least two signals have different subcarrier spacings; and sending, by the terminal, the terminal capability information to an access network device;

wherein the terminal capability information comprises at least one of the following:

uplink subcarrier spacings and uplink bandwidths supported by the terminal for sending signals in parallel, at least two of the uplink subcarrier spacings being different; and downlink subcarrier spacings and downlink bandwidths supported by the terminal for receiving signals in parallel, at least two of the downlink subcarrier spacings being different;

wherein before generating, by the terminal, the terminal capability information, the method further comprises:

receiving, by the terminal, first uplink subcarrier spacings and first uplink bandwidths and/or first downlink subcarrier spacings and first downlink bandwidths supported by a camped cell sent by the access network device;

wherein generating, by the terminal, the terminal capability information comprises:

generating, by the terminal, the terminal capability information, the terminal capability information comprising: second uplink subcarrier spacings and second uplink bandwidths, and/or second downlink subcarrier spacings and second downlink bandwidths;

wherein receiving, by the terminal, the first uplink subcarrier spacings and the first uplink bandwidths and/or the first downlink subcarrier spacings and the first downlink bandwidths supported by the camped cell sent by the access network device, comprises:

receiving, by the terminal, system information sent by the access network device; and retrieving, by the terminal, the first uplink subcarrier spacings and the first uplink bandwidths, and/or the first downlink subcarrier spacings and the first downlink bandwidths supported by the camped cell from a predetermined system information block in the system information.

2. The method according to claim 1, wherein the camped cell is a cell in which the terminal camps currently, the second uplink subcarrier spacings and the second uplink bandwidths are a subset of the first uplink subcarrier spacings and the first uplink bandwidths, and the second downlink subcarrier spacings and the second downlink bandwidths are a subset of the first downlink subcarrier spacings and first downlink bandwidths.

3. The method according to claim 1, wherein before sending, by the terminal, the terminal capability information to the access network device, the method further comprises:

receiving, by the terminal, a terminal capability enquiry sent by the access network device.

4. The method according to claim 1, wherein the terminal capability information is UE capability information.

5. An information receiving method, comprising:

receiving, by an access network device, terminal capability information sent by a terminal, the terminal capability information being used for indicating the terminal to transmit at least two signals in parallel, wherein the at least two signals have different subcarrier spacings;

wherein the terminal capability information comprises at least one of the following:

uplink subcarrier spacings and uplink bandwidths supported by the terminal for sending signals in parallel, at least two of the uplink subcarrier spacings being different; and downlink subcarrier spacings and downlink bandwidths supported by the terminal for receiving signals in parallel, at least two of the downlink subcarrier spacings being different;

wherein before receiving, by the access network device, the terminal capability information sent by the terminal, the method further comprises:

sending, by the access network device, first uplink subcarrier spacings and first uplink bandwidths and/or first downlink subcarrier spacings and first downlink bandwidths supported by a camped cell to the terminal;

wherein receiving, by the access network device, the terminal capability information sent by the terminal comprises:

receiving, by the access network device, the terminal capability information sent by the terminal, the terminal capability information comprising: second uplink subcarrier spacings and second uplink bandwidths, and/or second downlink subcarrier spacings and second downlink bandwidths;

wherein sending, by the access network device, the first uplink subcarrier spacings and the first uplink bandwidths and/or the first downlink subcarrier spacings and the first downlink bandwidths supported by the camped cell to the terminal, comprises:

sending, by the access network device, system information to the terminal, a predetermined system information block in the system information carrying the first uplink subcarrier spacings and the first uplink bandwidths and/or the first downlink subcarrier spacings and the first downlink bandwidths supported by the camped cell.

6. The method according to claim 5, wherein the camped cell is a cell in which the terminal camps currently, the second uplink subcarrier spacings and the second uplink bandwidths are a subset of the first uplink subcarrier spacings and the first uplink bandwidths, and the second downlink subcarrier spacings and the second downlink bandwidths are a subset of the first downlink subcarrier spacings and first downlink bandwidths.

7. The method according to claim 5, wherein before receiving, by the access network device, the terminal capability information sent by the terminal, the method further comprises:

sending, by the access network device, a terminal capability enquiry to the terminal.

8. The method according to claim 5, wherein the terminal capability information is UE capability information.

9. A terminal, comprising:

a processor configured to generate terminal capability information, the terminal capability information being used for indicating the terminal to transmit at least two signals in parallel, wherein the at least two signals have different subcarrier spacings; and a sender configured to send the terminal capability information to an access network device;

wherein the terminal capability information comprises at least one of the following:

uplink subcarrier spacings and uplink bandwidths supported by the terminal for sending signals in parallel, at least two of the uplink subcarrier spacings are different; and downlink subcarrier spacings and downlink bandwidths supported by the terminal for receiving signals in parallel, at least two of the downlink subcarrier spacings are different, wherein the terminal further comprises a receiver, wherein the receiver is configured to receive first uplink subcarrier spacings and first uplink bandwidths and/or first downlink subcarrier spacings and first downlink bandwidths supported by a camped cell sent by the access network device;

wherein the processor is configured to generate the terminal capability information, the terminal capability information comprising: second uplink subcarrier spacings and second uplink bandwidths, and/or second downlink subcarrier spacings and second downlink bandwidths;

wherein the receiver is configured to receive system information sent by the access network device; and wherein the processor is configured to retrieve the first uplink subcarrier spacings and the first uplink bandwidths, and/or the first downlink subcarrier spacings and the first downlink bandwidths supported by the camped cell from a predetermined system information block in the system information.

10. The terminal according to claim 9, wherein the camped cell is a cell in which the terminal camps currently, the second uplink subcarrier spacings and the second uplink bandwidths are a subset of the first uplink subcarrier spacings and the first uplink bandwidths, and the second downlink subcarrier spacings and the second downlink bandwidths are a subset of the first downlink subcarrier spacings and first downlink bandwidths.

11. The terminal according to claim 9, wherein the receiver is configured to receive a terminal capability enquiry sent by the access network device.

12. The terminal according to claim 9, wherein the terminal capability information is UE capability information.

* * * * *